(12) United States Patent  (10) Patent No.: US 8,374,992 B2
Meyyappan et al.  (45) Date of Patent: Feb. 12, 2013

(54) ORGANIZATION OF USER GENERATED CONTENT CAPTURED BY A SMART PEN COMPUTING SYSTEM

(75) Inventors: Vinaitheerthan Meyyappan, Danville, CA (US); Jim Marggraff, Lafayette, CA (US); Tracy L. Edgecomb, Berkeley, CA (US); Andy Van Schaack, Nashville, TN (US)

(73) Assignee: Livescribe, Inc., Oakland, CA (US)

( * ) Notice: Subject to any disclaimer, the term of this patent is extended or adjusted under 35 U.S.C. 154(b) by 1000 days.

(21) Appl. No.: 12/129,265

(22) Filed: May 29, 2008

(65) Prior Publication Data

US 2009/0063492 A1 Mar. 5, 2009

Related U.S. Application Data

(60) Provisional application No. 60/940,674, filed on May 29, 2007.

(51) Int. Cl.
*G06N 5/00* (2006.01)
(52) U.S. Cl. .............................. 706/62; 706/45
(58) Field of Classification Search .................. 706/62, 706/45
See application file for complete search history.

(56) References Cited

U.S. PATENT DOCUMENTS

| | | | |
|---|---|---|---|
| 5,321,832 A * | 6/1994 | Tanaka et al. ........................ | 1/1 |
| 5,412,795 A | 5/1995 | Larson | |
| 5,666,438 A | 9/1997 | Beernink et al. | |
| 5,745,782 A | 4/1998 | Conway | |
| 5,818,428 A | 10/1998 | Eisenbrandt et al. | |
| 6,195,693 B1 | 2/2001 | Berry et al. | |
| 6,456,749 B1 | 9/2002 | Kasabach et al. | |
| 6,490,563 B2 | 12/2002 | Hon et al. | |
| 6,752,317 B2 | 6/2004 | Dymetman et al. | |
| 6,956,564 B1 | 10/2005 | Williams | |
| 6,965,447 B2 | 11/2005 | Satake et al. | |
| 7,175,095 B2 | 2/2007 | Pettersson et al. | |
| 7,196,688 B2 | 3/2007 | Schena | |
| 7,281,664 B1 | 10/2007 | Thaeler et al. | |
| 7,388,685 B2 | 6/2008 | Kia et al. | |
| 7,475,078 B2 | 1/2009 | Kiilerich et al. | |

(Continued)

FOREIGN PATENT DOCUMENTS

CN 1444758 9/2003
WO WO 99/22338 5/1999

(Continued)

OTHER PUBLICATIONS

PCT International Search Report and Written Opinion, PCT/US2008/065148, Sep. 2, 2008, 8 pages.

(Continued)

*Primary Examiner* — Wilbert L Starks
(74) *Attorney, Agent, or Firm* — Fenwick & West LLP

(57) ABSTRACT

In a pen-based computing system, use of paradigms similar to those used with physical paper to organize user generated content captured by a smart pen is disclosed. Data, such as handwriting gestures, is captured by the smart pen and transferred to a digital domain, such as by being transferred to a computing system. Once in the digital domain, the captured content is organized as virtual pages or virtual notebooks. Hence, content captured from various sources, such as different notebooks or different physical pieces of paper, is assembled into a virtual page or virtual notebook. User input or automatic application of rules can be used to assemble the captured content into a virtual page or virtual notebook.

20 Claims, 4 Drawing Sheets

U.S. PATENT DOCUMENTS

| | | |
|---|---|---|
| 7,580,164 B2 | 8/2009 | Barrus et al. |
| 7,627,703 B2 | 12/2009 | Oliver |
| 7,633,493 B2 | 12/2009 | Syeda-Mahmood et al. |
| 7,916,124 B1 | 3/2011 | Wood et al. |
| 7,944,573 B2 | 5/2011 | Henry et al. |
| 2002/0079371 A1 | 6/2002 | Bobrow et al. |
| 2003/0061188 A1 | 3/2003 | Wiebe et al. |
| 2004/0229195 A1 | 11/2004 | Marggraff et al. |
| 2004/0240739 A1 | 12/2004 | Chang et al. |
| 2005/0024346 A1 | 2/2005 | Dupraz et al. |
| 2005/0093845 A1 | 5/2005 | Brooks et al. |
| 2006/0033725 A1 | 2/2006 | Marggraff et al. |
| 2006/0066591 A1 | 3/2006 | Marggraff et al. |
| 2006/0067576 A1 | 3/2006 | Marggraff et al. |
| 2006/0067577 A1 | 3/2006 | Marggraff et al. |
| 2006/0077184 A1 | 4/2006 | Marggraff et al. |
| 2006/0078866 A1 | 4/2006 | Marggraff et al. |
| 2006/0080608 A1 | 4/2006 | Marggraff et al. |
| 2006/0080609 A1 | 4/2006 | Marggraff et al. |
| 2006/0125805 A1 | 6/2006 | Marggraff et al. |
| 2006/0127872 A1 | 6/2006 | Marggraff et al. |
| 2006/0147117 A1 | 7/2006 | Wakeam et al. |
| 2006/0159345 A1 | 7/2006 | Clary et al. |
| 2006/0215886 A1 * | 9/2006 | Black ............................. 382/124 |
| 2006/0292543 A1 | 12/2006 | Marggraff et al. |
| 2007/0011140 A1 | 1/2007 | King et al. |
| 2007/0030257 A1 | 2/2007 | Bhogal et al. |
| 2007/0085833 A1 | 4/2007 | Gershuni |
| 2007/0097100 A1 | 5/2007 | Marggraff et al. |
| 2007/0143663 A1 | 6/2007 | Hansen et al. |
| 2007/0280627 A1 | 12/2007 | Marggraff et al. |
| 2008/0141143 A1 | 6/2008 | O'Hara et al. |
| 2010/0039296 A1 | 2/2010 | Marggraff et al. |
| 2010/0309131 A1 | 12/2010 | Clary et al. |

FOREIGN PATENT DOCUMENTS

WO   WO 2007/141204 A1   12/2007

OTHER PUBLICATIONS

Patent Office of the People's Republic of China, First Office Action, Patent Application No. 2008-80023794.6, Apr. 20, 2011, twenty-one pages.

PCT International Search Report and Written Opinion, PCT Application No. PCT/US2008/065144, Sep. 9, 2008, six pages.

* cited by examiner

ORGANIZATION OF USER GENERATED CONTENT CAPTURED BY A SMART PEN COMPUTING SYSTEM

CROSS REFERENCE TO RELATED APPLICATIONS

This application claims the benefit of U.S. Provisional Application No. 60/940,674, filed May 29, 2007, which is incorporated by reference in its entirety.

BACKGROUND

This invention relates generally to pen-based computing systems, and more particularly to organization of data captured by a smart pen.

Devices exist for electronically capturing strokes made by a pen-type input device. However, existing devices are usually limited in their functionality. Many have limited or no processing power and are therefore limited simply to storing strokes for later off-pen processing. The lack of sufficient on-pen processing power also significantly limits the ability of these devices to execute more sophisticated pen-based software applications. In addition to a lack of processing power, existing devices typically are also limited in the number and types of interface I/O modalities, if any, that are present in addition to stroke capture. For example, very few, if any, devices can simultaneously support many modalities, such as audio capture, audio playback, and visual feedback.

Furthermore, although existing tools enable the creation of digital documents from notes that were taken by a pen-type input device, their ability to allow a user to organize these notes in a meaningful way is limited. Organization is largely limited to the approach used for more traditional digital documents: the creation of a hierarchical folder system and the placing of digital documents (e.g., notes) into the appropriate folders. While this organization approach may be suitable for other types of digital documents, it does not fully take advantage of the "paper" nature of digital documents captured by pen-type input devices and smart pen computing systems. It also can be time-consuming if the user is required to manually move documents to the appropriate folders.

Accordingly, new approaches to organizing "digital paper" are needed to fill the needs unmet by existing methods

SUMMARY

Embodiments of the invention use organization paradigms similar to those used with physical paper to organize user generated content captured by a smart pen computing system. A smart pen in a pen-based computing system captures handwriting gestures, such as the taking of notes, made by a user. In an embodiment, other input, such as a conversation occurring when the notes were taken, is simultaneously captured by the smart pen. The captured content then is transferred to a digital domain. For example, the captured content may be communicated to a computing system, such as a desktop computer. The captured content is then organized as virtual pages and/or virtual notebooks. Content captured from different physical pages can be assembled into a "virtual page." For example, the upper right of the virtual page may come from a first source, the upper left of the virtual page from a second source, and the bottom of the virtual page from one or more additional sources. Either virtual or physical pages can be assembled into a virtual notebook. The assembly of content into virtual pages and/or virtual notebooks can be done manually or automatically, for example, applying one or more rules to the captured data.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
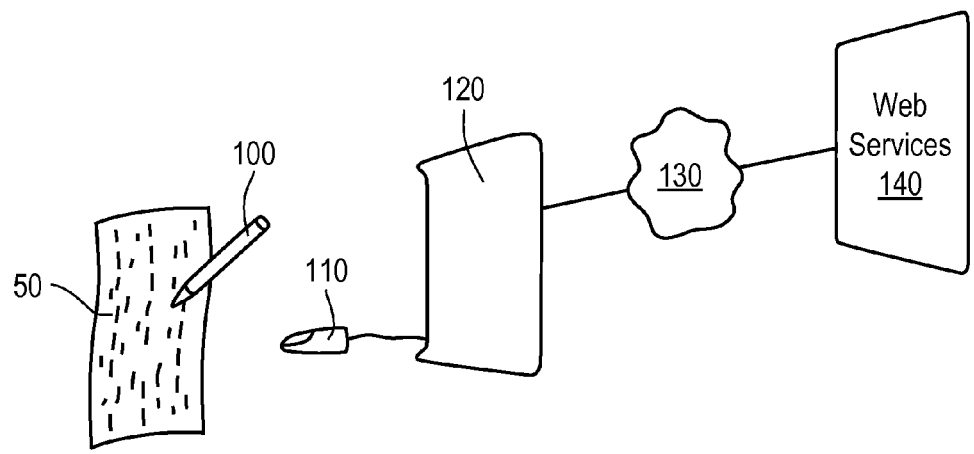
FIG. 1 is a schematic diagram of a pen-based computing system, in accordance with an embodiment of the invention.

Embodiments of the invention may be implemented on various embodiments of a pen-based computing system, an example of which is illustrated in FIG. 1. In this embodiment, the pen-based computing system comprises a writing surface 50, a smart pen 100, a docking station 110, a computing system 120, a network 130, and a web services system 140. The smart pen 100 includes onboard processing capabilities as well as input/output functionalities allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
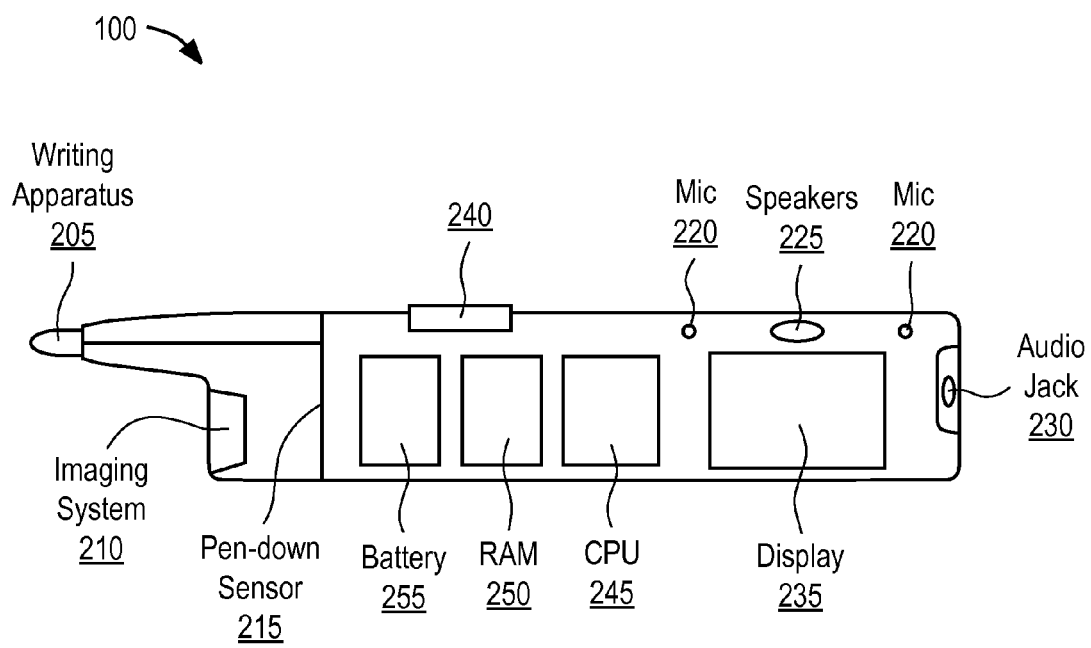
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Virtual Pages

Figure 3:
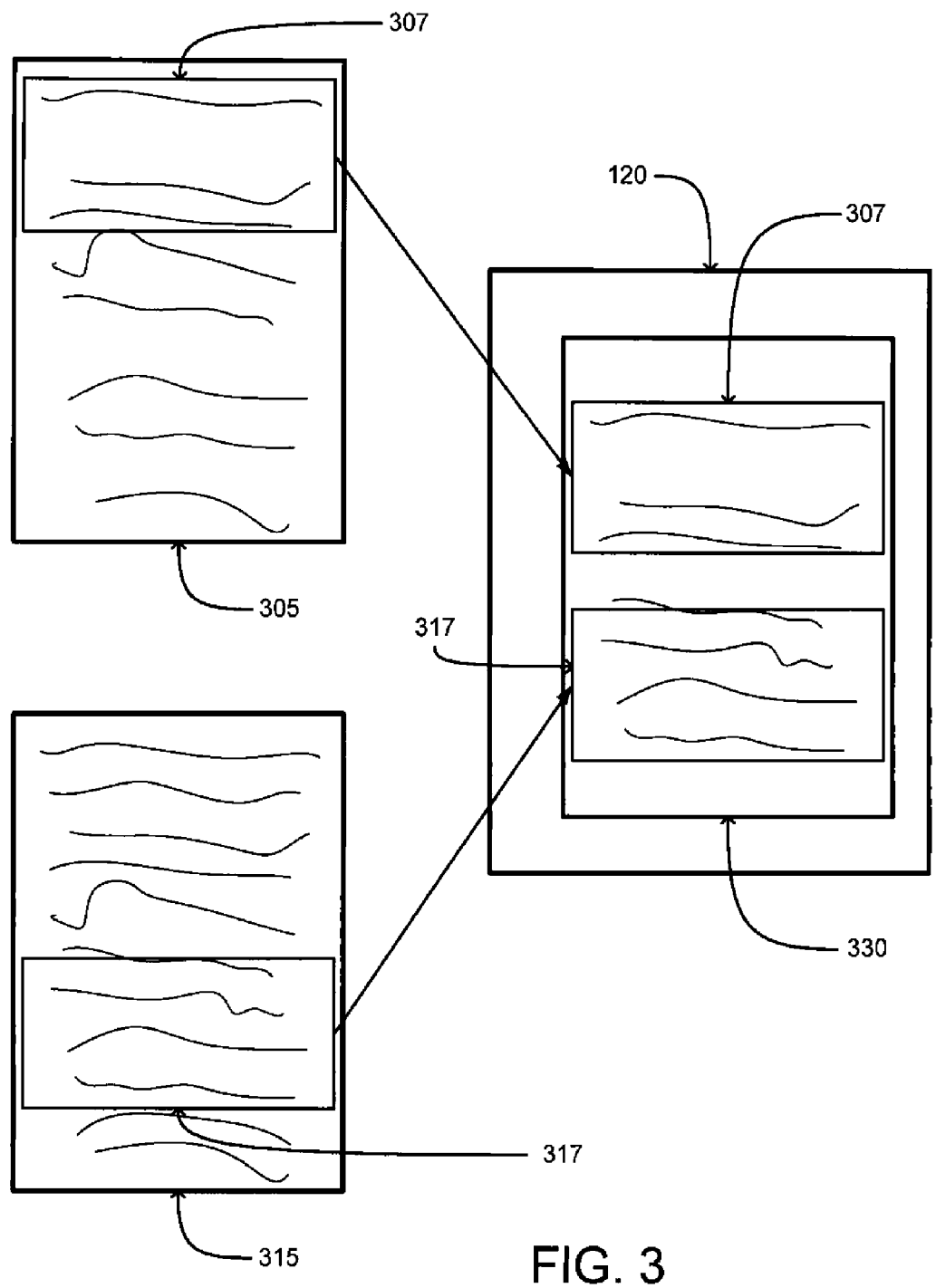
FIG. 3 is an example virtual page including content from different physical pages according to an embodiment of the invention.

FIG. 3 is an example of a virtual page including content captured by a smart pen from different sources, such as different physical pages, according to an embodiment of the invention. For purposes of illustration, FIG. 3 depicts a first physical page 305 and a second physical page 315 as sources for the captured data; however, in other embodiments additional sources, such as additional physical pages, may be included. The first physical page 305 includes a first content 307, such as handwritten notes, as well as additional content. Similarly, the second physical page 315 includes a second content 317, such as additional handwritten notes, as well as additional content.

A virtual page 330 is generated including content from both the first physical page 305 and the second physical page 315 in a manner analogous to physically cutting and pasting content from the first physical page 305 and the second physical page 315 onto a common page. However, virtual page generation is not limited to the example shown in FIG. 3. For example, a user may paste digital ink, audio, metadata or tags copied from a source page into a virtual page 330. In the example shown in FIG. 3, the virtual page 330 includes the first content 307 from the first physical page 305 and the second content 317 from the second physical page 315. Hence, the first content 307 and the second content 317 are captured by a smart pen 100 and a digital representation of the first content 307 and the second content 317 is generated by the smart pen 100 or computing system 100.

The computing system 120 then generates a virtual page that includes the digital representation of the first content 307 and the digital representation of the second content 317. This allows data to be converted from the physical domain on the first physical page 305 and the second physical page 315 into the digital domain on the virtual page 330. As the virtual page 330 can include content from several source pages, generation of a virtual page 330 allows a user to more effectively organize content by including related data or information in a common location. Although FIG. 3 shows capturing data from different physical pages, in other embodiments, data may be captured from different locations on a single physical page. This allows data to be reorganized on the virtual page 330.

In an embodiment, virtual pages are manually created by user selection of content from various sources, such as physical pages or other virtual pages, for inclusion in a virtual page 330. A virtual page might be created by the following method. The user locates the page representation that contains information that they wish to add to a virtual page. They then use a "marquee selection" tool to draw a rectangle around a section of the page. The user then selects "copy to Virtual Page" from a menu. They can then create a new virtual page or select from a list of existing virtual pages. The user then is shown the selected virtual page with the rectangular selection of content hovering on the page. The user can slide the selection around to the desired location on the page, and then confirm the location. The rectangular selection is then locked in place on the page. More advanced methods could be supported, such as using a free-form selection tool to identify content for the virtual page. Additionally, automatic area detection may be sued to select regions of a page. For example, software detects where a box or outline had been drawn around information on a page using the smart pen 100 and the area included in the box or outline is automatically copied to the virtual page. Areas of adjacent text, writing or drawing could automatically be selected and copied to the virtual page.

Alternatively, virtual pages are automatically created by applying one or more rules, which may be user defined, to content or data. In such an embodiment, content including one or more specific keywords may be automatically added to a virtual page. For example, content including the phrase "To do" is automatically identified and included in a virtual page 330, thereby allowing users to create a "To do" list by writing a note anywhere on dot-enabled paper, and the system automatically organizes those items onto a virtual page. Automatic character recognition can be used to allow identification of keywords within handwritten data.

Additionally, a user can add information directly to the virtual page, either in the physical domain or the digital domain. For example, the user can add highlights or annotations to the content included in the virtual page 330. In another embodiment, the user links data on the virtual page 330 to another application, such as a hyperlink to a web site, a phone number, a voice note, a paper replay session, an image, an audio file, allowing access to a variety of applications, including applications unrelated to the smart pen computing system from the virtual page.

The virtual page 330 may be linked to the a source page, such as the first physical page 305, the second physical page 315 or both the first physical page 305 and the second physical page 315. The link between virtual page 330 and the source, such as first physical page 305 and/or second physical page 315 can be a static link or a dynamic link. In a static link, the selected portion of the source, such as the first content 307 of the first physical page 305, is copied to the virtual page 330 and subsequent modifications to the first physical page 305 and the virtual page 330 are independent of each other. Later changes to the first physical page 305 are not reflected in the virtual page 330 and vice versa.

Two types of dynamic links are possible: a two way dynamic link and a one-way dynamic link. In a two-way dynamic link, subsequent changes to either the source, such as the first physical page 305, or the virtual page 330 are reflected in the other page. For example, modification of the first physical page 305 causes corresponding modification of the virtual page 330. In a one-way dynamic link, changes in one of the source (e.g., the first physical page 305) or the virtual page 330 are reflected in the other page, but not vice versa. For example, changes to the first physical page 305 cause corresponding changes to the virtual page 330, but changes to the virtual page 330 do not cause corresponding changes to the first physical page 305.

Virtual Notebooks

Figure 4:
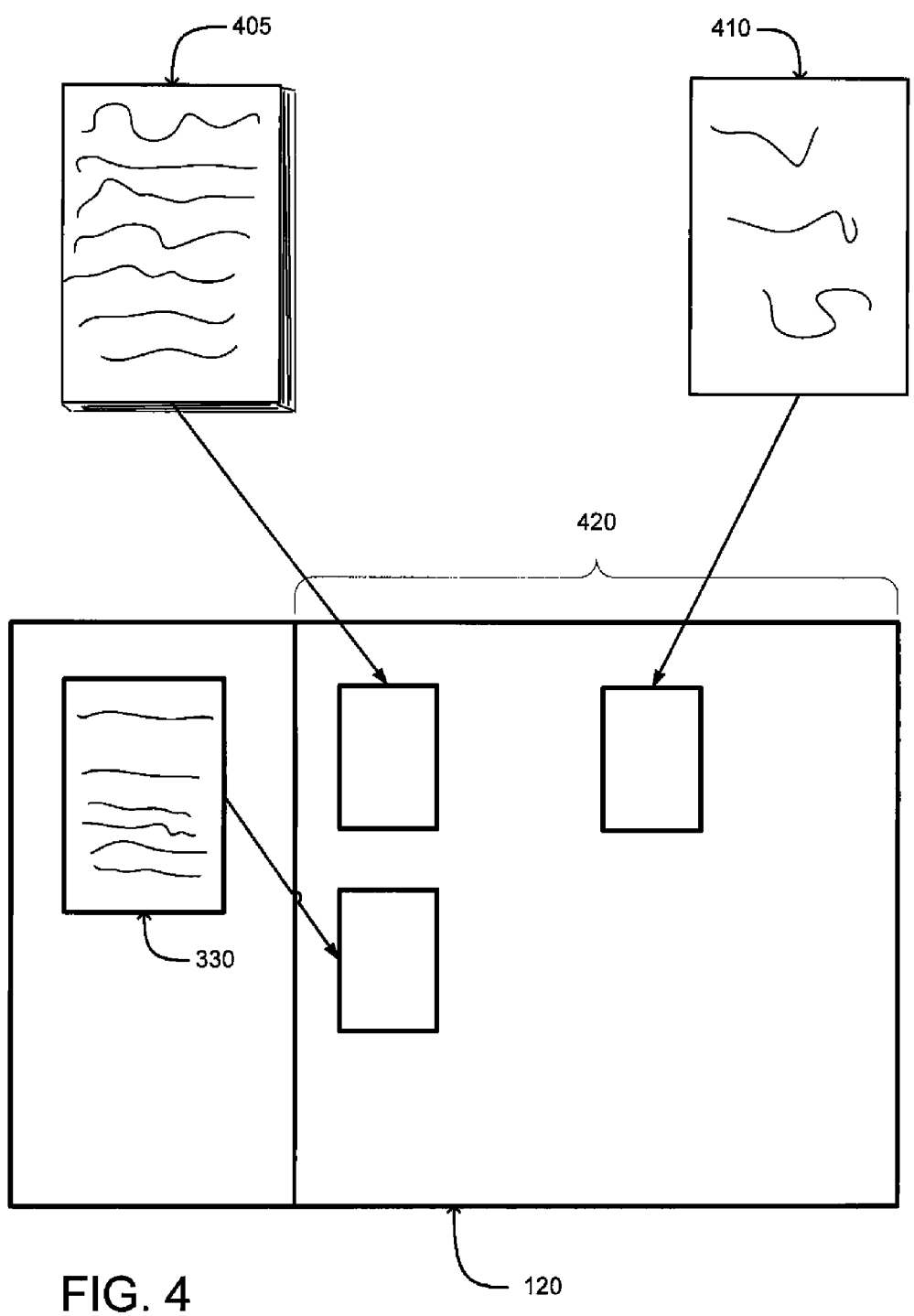
FIG. 4 is an example virtual notebook including content from different sources according to an embodiment of the invention.

FIG. 4 is an example of a virtual notebook including content from various sources according to an embodiment of the invention. For purposes of illustration, FIG. 4 depicts a physical notebook 405, a physical page 410 and a virtual page 330 as sources; however, in other embodiments, additional types of sources are included. The sources can comprise different types and sizes of paper.

Content from various sources, such as the physical notebook 405, the physical page 410 and the virtual page 330 is assembled into a virtual notebook 420 in a manner analogous to physically placing separate pages into a common notebook, such as a three-ring binder. For example, data is captured from different sources, such as the physical notebook 405, the physical page 410 or the virtual page 330, and a digital representation of the data captured from these sources is communicated to computing system 120. In turn, the computing system 120 associates one or more digital representations of content with a virtual notebook 420. Hence, the virtual notebook 420 allows content or data from various sources to be grouped together, simplifying subsequent access to the content or data. As shown in FIG. 4, the content of the virtual notebook 420 can come from various sources, such as the physical notebook 405, the physical page 410, a virtual page 330, or other third party applications. The content can also be of various types, such as digital ink, recorded video, recorded audio, other multi-media types or combinations of these types. For example, a student may generate a condensed study guide based on notes taken throughout a semester by selecting relevant sections from the notes and copying the selected sections to a virtual notebook. The virtual notebook then includes only the selected notes and any other data, such as audio and metadata associated with the selected notes. Alternatively, an individual may be reading a document, magazine or book printed on encoded paper. When the individual identifies a noteworthy passage of text, image or other data, the individual selects the noteworthy elements and copies them to a virtual notebook. The virtual notebook includes only those elements of interest to the individual. As another example, a user annotates a magazine, book or other document with user comments. This combination of user-provided and preexisting content can be copied and pasted into a virtual notebook as described above.

Additionally, content included in the virtual notebook 420 can be selected in various ways. For example, the smart pen computing system offers different levels of granularity for selection. The selection could be specific pieces of digital ink, specific areas of a page, specific pages of a notebook or one or more complete notebooks. Alternatively, selection can be based on content. For example, content can be selected based on a keyword search so that content including a specific keyword is added to the virtual notebook 420.

In an embodiment, virtual pages 330 and/or virtual notebooks 420 are manually created by user selection of content from various source pages for inclusion in a virtual page 330. Alternatively, virtual pages 330 or virtual notebooks 420 are automatically created based on one or more rules, which may be user defined. In an embodiment, content including one or more specific keywords is automatically added to a virtual page 330 or to a virtual notebook 420. For example, content including the phrase "smart pen" is automatically identified and grouped into a virtual page 330 or into a virtual notebook 420. Automatic character recognition can be used to allow identification of keywords within handwritten data.

In one example, the pen-based computing system obtains the text on the first line of the page and organizes the content based on this text. For example, the user may take all class notes in a single notebook and, for each new class, write the name or some other indicia of the particular subject to which the page of notes apply (e.g., math, physics, English, and history classes). The captured content from that notebook is then organized automatically by subject based on the class subject. In this way, a user can takes all class notes in a single notebook, and the system automatically organizes those notes by class subject into different notebooks. It can be appreciated that other conventions can be used for indicating the class subject (or other organization scheme), such as defining a field on each page (e.g., a printed box in the upper right corner of each page) where the user can indicate the content to be used for organizing the virtual pages.

Alternatively, content can be associated with a virtual notebook 420 responsive to location of data on a physical page or within a source. For example, a user may consistently put identification information, such as date, class name, committee name, title or similar identification material, in a specific location, such as the upper right or top center, of a physical page or other source. Data from the physical page or other source is then automatically associated with one or more virtual notebooks 420 based on the identification information provided by the user. For example, a user may place a date in the upper right and a course identification in the upper left, based on the course identification, notes may be automatically associated with a course-specific virtual notebook 420. In other embodiments, other rules, such as metadata or tag content, the data capture time, presence or absence of associated audio, audio analysis (e.g., identification of speakers or locations), association of content with other applications or other suitable criteria may be used to associate content with a virtual notebook 420 or a virtual page 330.

Alternatively, multiple users can create a virtual notebook 420 which can be stored on a central server rather than on a computer system 120 associated with a single user. Different users then access the central server to contribute to, or view data from, the virtual notebook 420. Portions of the virtual notebook 420 could also be automatically created through the use of rules. The virtual notebook 420 would be accessible by users other than those creating it, allowing multiple users to access the content of the virtual notebook 420.

In an embodiment, the smart pen computing system controls access to one or more virtual pages 330 and/or virtual notebooks 420. For example, a virtual page 330, a virtual notebook 420 or another quantity of content can be defined as private, so that only a user can access the content; semi-private, so that only a subset of users can access the content; or public, so that all users can access the content. In an embodiment, the smart pen computing system also allows different access rights to be assigned to different virtual pages 330 or virtual notebooks 420, allowing view rights, edit rights, copy rights, or other rights to be assigned to individual users or groups of users.

Example System Operation

Figure 5:
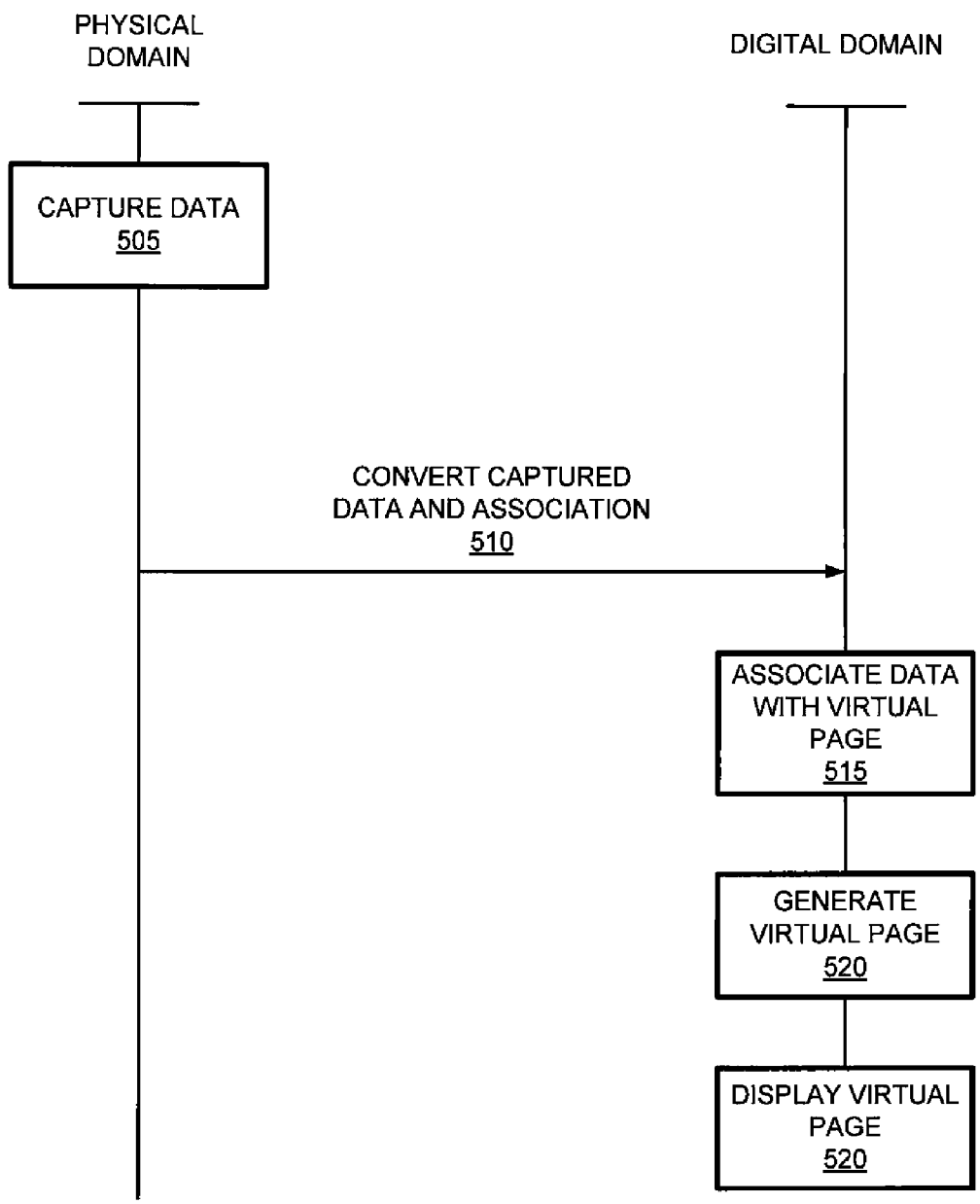
FIG. 5 is an event diagram describing generation of a virtual page according to an embodiment of the invention.

FIG. 5 is an event diagram describing generation of a virtual page according to an embodiment of the invention. Those of skill in the art will recognize that other embodiments can perform the steps of FIG. 5 in different orders. Moreover, other embodiments can include different and/or additional steps than the ones described here.

Initially, data is captured 505 in the physical domain by a smart pen 100. For example, the imaging system 210 of a smart pen captures handwriting data or other text data proximate to the smart pen 100. The captured data is then converted 510 from the physical domain to the digital domain to create a digital representation of the captured data. In one embodiment, conversion 510 from physical domain to digital domain comprises transmitting the captured data from the smart pen 100 to the computing system 120.

The converted captured data is then associated 515 with a virtual page or a virtual notebook. In one embodiment, a user provides input to the computing system 120, such as a keyword or virtual page identifier, to manually associate 515 captured data with a virtual page or a virtual notebook. Alternatively, the computing system 120 applies one or more rules, such as a keyword search, examination of the time of data capture or metadata, to automatically associate 515 the captured data with a virtual page or virtual notebook. A virtual page is then generated 520 including the captured data. For example, a new virtual page is generated 520 including the digital representation of the captured data. Alternatively, the digital representation of the captured data is imported into an existing virtual page, causing generation 520 of a revised virtual page additionally including the digital representation of the captured data. In an embodiment, the generated virtual page is then displayed 520 by the computing system 120. For example, the virtual page is displayed in the digital domain to simulate a physical page, or a virtual notebook is displayed so as to simulate a physical notebook.

Hence, the virtual notebook can be browsed using computing system 120 by "flipping" between pages as with a physical notebook. Alternatively, a user may simultaneously view multiple pages as small representations of the different pages, or "thumbnails" then select a particular thumbnail to view a full-size version of the selected thumbnail. Additionally, the content of the virtual notebook can be searched to more easily identify a term or concept. Hence the virtual notebook provides a convenient method to group content from various physical pages according to a single subject or theme into a common location, even if the physical pages including the original content are spread across a variety of physical notebooks and/or other documents. For example, a student working on a thesis may have notes in several different notebooks as well as on index cards and other scraps of paper. Grouping all of these pages into a virtual notebook allows this user to flip through all the related pages without being distracted by intervening pages that are unrelated to the thesis. Also, they can perform a search, such as finding all pages in the virtual notebook that contain the word "hypothesis", or all pages that were created on Apr. 22, 2008. Without having the pages grouped into a virtual notebook, they would have to search all their notebooks and would get many irrelevant search results. Additionally, virtual notebooks make it convenient to print or upload all the pages, or a series of pages, in a single action.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a virtual page the method comprising:
    capturing data from a first physical source using a smart pen;
    capturing data from a second physical source using the smart pen;
    transferring the data captured from the first physical source and the data captured from the second physical source to a digital domain;
    receiving an input associating the data captured from the first physical source and the data captured from the second physical source; and
    generating the virtual page including the data captured from the first physical source and the second physical source based on the input.

2. The method of claim 1, wherein receiving the input associating the data captured from the first physical source and the data captured from the second physical source comprises:
    automatically applying one or more rules to the data captured from the first physical source; and
    automatically applying one or more rules to the data captured from the second physical source.

3. The method of claim 2, wherein the one or more rules comprise comparison of the data captured from the first physical source or the data captured from the second physical source to a keyword.

4. The method of claim 2, wherein the one or more rules comprise determining the presence of audio associated with the data captured from the first physical source or the data captured from the second physical source.

5. The method of claim 2, wherein the one or more rules comprise determining the absence of audio associated with the data captured from the first physical source or the data captured from the second physical source.

6. The method of claim 2, wherein the one or more rules comprise determining a capture time associated with the data captured from the first physical source or the data captured from the second physical source.

7. The method of claim 1, further comprising:
associating an access control with the virtual page, the access control identifying a subset of users able to access the virtual page.

8. The method of claim 1, further comprising:
associating the virtual page with a second virtual page to generate a virtual notebook.

9. The method of claim 1, further comprising:
generating a physical representation of the virtual page including the data captured from the first physical source and the second physical source.

10. A computer program product for generating a virtual page, the computer program product comprising a computer-readable storage medium containing computer program code for:
generating a virtual page the method comprising:
capturing data from a first physical source using a smart pen;
capturing data from a second physical source using the smart pen;
transferring the data captured from the first physical source and the data captured from the second physical source to a digital domain;
receiving an input associating the data captured from the first physical source and the data captured from the second physical source; and
generating the virtual page including the data captured from the first physical source and the second physical source responsive to the input.

11. The computer program product of claim 10, wherein receiving the input associating the data captured from the first physical source and the data captured from the second physical source comprises:
automatically applying one or more rules to the data captured from the first physical source; and
automatically applying one or more rules to the data captured from the second physical source.

12. The computer program product of claim 11, wherein the one or more rules comprise comparison of the data captured from the first physical source or the data captured from the second physical source to a keyword.

13. The computer program product of claim 11, wherein the one or more rules comprise determining the presence of audio associated with the data captured from the first physical source or the data captured from the second physical source.

14. The computer program product of claim 11, wherein the one or more rules comprise determining the absence of audio associated with the data captured from the first physical source or the data captured from the second physical source.

15. The computer program product of claim 11, wherein the one or more rules comprise determining a capture time associated with the data captured from the first physical source or the data captured from the second physical source.

16. The computer program product of claim 10, further comprising:
associating an access control with the virtual page, the access control identifying a subset of users able to access the virtual page.

17. The computer program product of claim 10, further comprising:
associating the virtual page with a second virtual page to generate a virtual notebook.

18. The computer program product of claim 10, further comprising:
generating a physical representation of the virtual page including the data captured from the first physical source and the second physical source.

19. A pen-based computing system for generating a virtual page, the system comprising:
a smart pen configured to:
capture data from a first physical source;
capture data from a second physical source;
transfer the data captured from the first physical source and the data captured from the second physical source to a digital domain;
the digital domain configured to:
receive an input associating the data captured from the first physical source and the data captured from the second physical source; and
generate the virtual page including the data captured from the first physical source and the second physical source based on the input.

20. The pen-based computing system of claim 19 wherein the digital domain is further configured to generate a physical representation of the virtual page including the data captured from the first physical source and the second physical source.

* * * * *